United States Patent
Murray et al.

(10) Patent No.: US 6,356,943 B2
(45) Date of Patent: Mar. 12, 2002

(54) DISTANCE LEARNING IMPLEMENTATION

(75) Inventors: Daniel Murray, Shrewsbury; Mark Nugent, Fitchburg; Kevin Hunt, Northborough; Mark Fargnoli, Lowell, all of MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/211,026

(22) Filed: Dec. 14, 1998

(51) Int. Cl.[7] .......................................... G06F 15/177
(52) U.S. Cl. ..................... 709/220; 709/204; 709/203
(58) Field of Search ........................... 709/204, 203, 709/227, 250, 238, 201, 220

(56) References Cited

U.S. PATENT DOCUMENTS

| | | | | |
|---|---|---|---|---|
| 5,909,569 A | * | 6/1999 | Housel, III et al. | 703/21 |
| 5,918,039 A | * | 6/1999 | Bushwell et al. | 703/27 |
| 5,941,949 A | * | 8/1999 | Pedersen | 709/227 |
| 5,974,446 A | * | 10/1999 | Sennenreich et al. | 709/204 |
| 6,014,694 A | * | 1/2000 | Aharoni et al. | 709/219 |
| 6,052,685 A | * | 4/2000 | Eastwick et al. | 707/10 |
| 6,061,714 A | * | 5/2000 | Housel, III et al. | 709/203 |
| 6,064,382 A | * | 5/2000 | Diedrich et al. | 345/335 |
| 6,085,247 A | * | 7/2000 | Parsons, Jr. et al. | 709/227 |
| 6,233,542 B1 | * | 5/2001 | Butts et al. | 703/27 |

OTHER PUBLICATIONS

Citrix MetaFrame 1.8 Backgrounder Citrix Systems, Inc., 1999.*
Citrix Installation Management Services Version 1.0 Installation Script Reference Citrix Systems, Inc., 1999.*
WinFrame in Education Citrix Systems, Inc., 1998.*
Server Based Computing in Education Citrix Systems Inc., 1999.*

* cited by examiner

*Primary Examiner*—Mehmet B. Geckil
(74) *Attorney, Agent, or Firm*—Brian L. Michaelis; Brown, Rudnick, Freed & Gesmer

(57) ABSTRACT

A distance learning implementation is effected as a client/server solution with a centralized server facility and a remote client facility. The centralized server facility includes a first network with at least one host processor system and associated operating software. Each of the at least one host processor system(s) is configured in the network with at least one specialized apparatus, such as an Integrated Cache Disk Array, which represents an operating environment for purposes of training remote trainees. A gateway, in the form of a router, provides access to the centralized server facility network, and the at least one host processor system is selectably accessible through a switch in the server facility network. A remote training facility network is configured as a client with a minimal amount of hardware to access the centralized server facility network over a standard digital communications network, such as an integrated services digital network (ISDN) line. The remote training facility network comprises at least one portable computer, such as a laptop PC, interconnected via a hub router to the standard digital communications network. The remote training facility is easily configured and deconfigured by a training specialist.

12 Claims, 2 Drawing Sheets

DISTANCE LEARNING IMPLEMENTATION

FIELD OF THE INVENTION

The present invention relates to computer interconnectivity in general, and more specifically to an inter-network based system enabling training of multiple users at remote sites using stationary and geographically remote computer equipment.

BACKGROUND OF THE INVENTION

In modem computer implementations, there are frequently very specialized and expensive apparatus for which training of end users is required. Because of the cost of these apparatus, it is frequently not cost effective for a purchaser to divert the apparatus from its intended, specialized implementation in order for training to be performed. This is especially true where the equipment is implemented for a critical use, and cannot be diverted. Equally infeasible is for the manufacturer of the specialized equipment to transport, configure and implement an additional unit at the purchaser's site to facilitate training, or to transport the potentially numerous end users to a central training facility.

The notion of a distance learning arrangement using area networks is known. Interactive Distance Learning (IDL) is a proven training method that uses interactive technologies to allow instructors and students to communicate from geographically dispersed locations. Instruction can be transmitted through a business television network, point-to-point videoconferencing networks, or over the Internet or intranets. IDL allows one expert to transmit to and to train a potentially unlimited audience. Plus, it provides a means for immediately ascertaining audience comprehension and tracking overall training results. The classic IDL model is the transmission of training over these networks in an essentially broadcast-type manner, with feedback permitted back to the instructor. These prior art solutions, however, are not configured to allow multi-user point-to-point interface to a central processing apparatus from a remote site. That is, trainees at the remote site are typically not able to train in the real-time environment of the specialized, expensive apparatus. Again, transporting the specialized, expensive equipment or apparatus to the remote site for real-time environment training is cost prohibitive. In any event, installing such transported equipment might take weeks or months to install and configure, and would require many manhours provided by highly technically trained personnel.

Other prior art tools are predominantly configured for conferencing between different users over a network, or multipoint dataconferencing.

Multimedia telecommunications using multipoint dataconferencing involve the transport of information signals in a wide range of formats flexibly. Therefore, the communication protocol must not be confined to point-to-point operation between identical terminals but permit group working between many terminals which may be geographically dispersed and very diverse in their types. Such a protocol is defined in a series of ITU Recommendations collectively referred to as the T. 120 series. Such multimedia telecommunications does not address the problem of training remote trainees in the real-time environment of specialized, expensive apparatus.

Microsoft's® NetMeeting, which employs the T.120 standard, is perhaps the best known remote conferencing software available. Using NetMeeting, users in different locations with access to the Internet, or an intranet, can communicate via audio and video, and share Windows® based applications. While NetMeeting has been relatively successful in allowing collaboration over a network, the software is designed to allow several users to share data and to provide video telephony between conference participants. The software does not support multiple remote user access to a single resource and the independent transmission of data to a separate audiovisual device, such as an LCD projector. NetMeeting is designed to share screen behavior, and not to facilitate common interface sharing. Thus, while NetMeeting is potentially useful for collaborative use of a Window® application, and for transferring digital behavior from one user to another, it is ill-suited for distance learning where a central resource is to be shared by multiple remote users in real time. Further, because NetMeeting is designed to operate over the Internet or local intranet, the content data which is transmitted is subject to the T.120 standard for data conferencing, which is primarily designed for whiteboarding, chatting, and file transfer.

Other conferencing products include Atrium™ and Connectix Videophone. As with NetMeeting®, these programs do not solve the ongoing need for a transportable, remote client/central server solution for Distance Learning. None of the available conferencing products facilitate training of remote users in the real-time environment of an expensive, specialized apparatus centrally located some distance from the remote trainees.

SUMMARY OF THE INVENTION

The present invention provides an easily transportable, quickly deployable distance learning implementation for networked communication between centralized host processor equipment and specialized, expensive systems, and a remote classroom with a plurality of students.

According to the invention, a distance learning implementation is effected as a client/server solution with a centralized server facility and a remote client facility. The centralized server facility includes a first network with at least one host processor system and associated operating software. Each of the at least one host processor system(s), such as a mainframe, UNIX-based or Windows NT-based server, is configured in the network with at least one specialized apparatus, such as an Integrated Cache Disk Array, which represents an operating environment for purposes of training remote trainees. A gateway, in the form of a router, provides access to the centralized server facility network, and the at least one host processor system is selectably accessible through a switch in the server facility network.

In further accord with the invention each remote training facility network is configured as a client with a minimal amount of hardware to access the centralized server facility network over a standard digital communications network, such as an integrated services digital network (ISDN) line. Each remote training facility network comprises at least one portable computer, such as a laptop PC, interconnected via a hub router to the standard digital communications network. The remote training facility is easily configured and deconfigured by a training specialist.

Features of the invention include configuration of multiple remote training facilities that are easily portable as a result of minimized component configuration. The distance learning implementation empowers an organization to replicate the online experience that students will encounter when using the central resource, such as the real-time environment of a host system and/or expensive dedicated system, without incurring the costs (and risk) associated with transporting specialized, expensive equipment to a remote site for training, and without incurring the cost of transporting trainees to a centralized facility or premises housing the specialized, expensive equipment on which the trainees are trained. Training can be provided to a plurality of users, at low cost, at multiple remote sites using the real-time environment of a central resource including expensive, sophisticated hardware and software that is effectively protected by the limited access thereto. The remote site to which training is delivered can be virtually anywhere in the world with an appropriate connection type, including a client's own site, or even hotel and conference rooms. The training equipment according to the invention is highly and easily portable for use in any location, with scaleability and flexibility allowing easy upgrading or migration to different connectivity options or platforms as needs change. Minimal configuration changes and minimal recabling between sites is required over time, in one embodiment, through the use of ISDN technology. The illustrative implementation according to the invention, uses an ISDN, circuit switched service, which means that the remote site is only connected when it is being used. This keeps telecommunications line charges for the client to server connection to a minimum. The configuration uses standard, commercially available hardware at the central site and in the remote classroom to arrive at an economical, easy to implement and easily portable distance learning solution.

BRIEF DESCRIPTION OF THE DRAWINGS

The foregoing and other features and advantages of the present invention will be more fully understood from the following detailed description of an illustrative embodiment, taken in conjunction with the accompanying drawing in which.

DETAILED DESCRIPTION OF AN ILLUSTRATIVE EMBODIMENT

Figure 1:
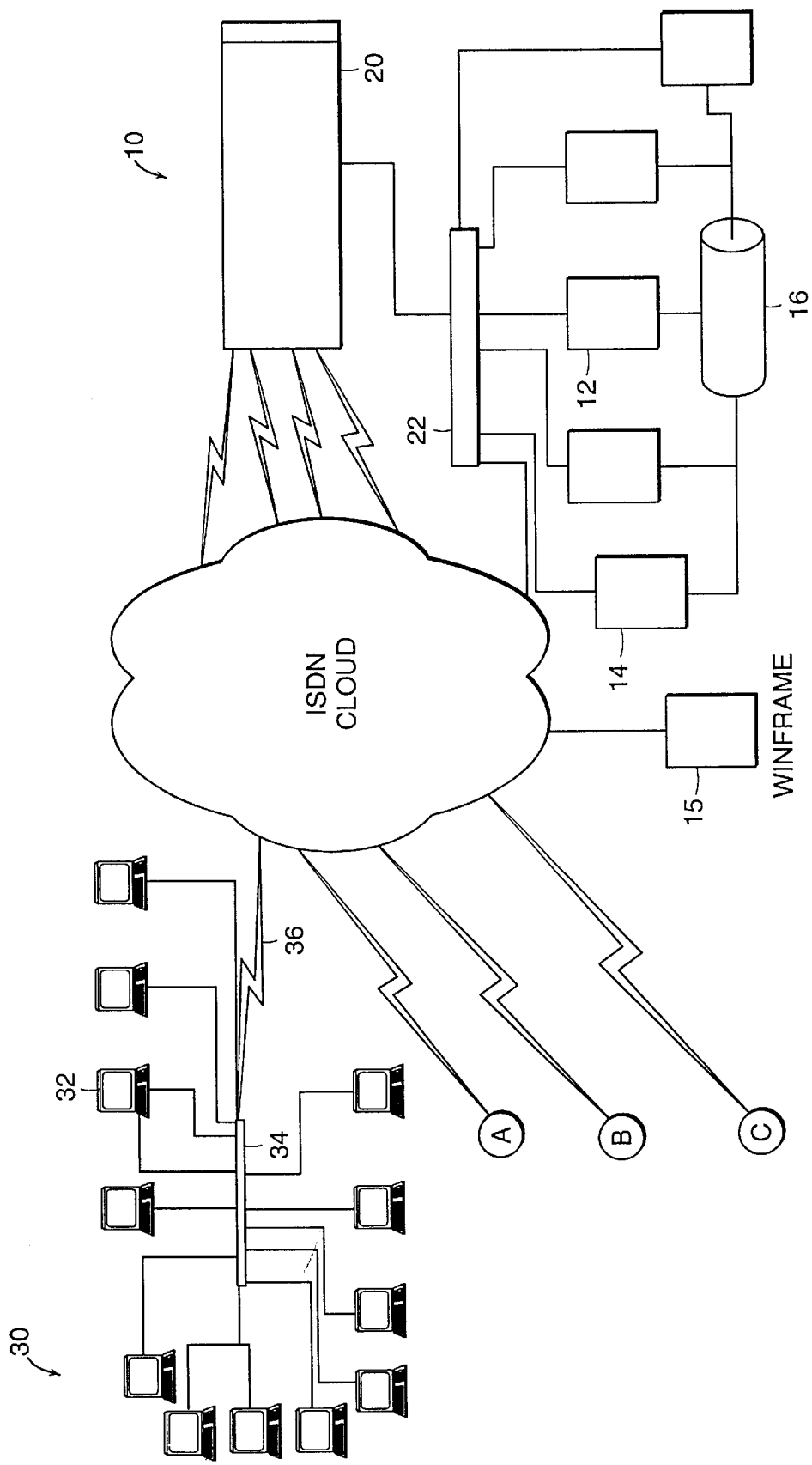
FIG. 1 is a block diagrammatic overview of a distance learning configuration according to the invention.

The present invention will be described herein with reference to an illustrative embodiment of a distance learning configuration as depicted in FIG. 1. The invention relies on a client/server model of distributed computing. A central resource 10 is located at a central site, and comprises one or more stationary facilities. These stationary facilities in this illustrative embodiment comprise different hardware platforms and respective operating systems. An Amdahl mainframe(s) 12 and/or other host processor systems 14, each of which can be configured to be accessed remotely during the course of training, represent significant bulk and hardware cost that makes shipping to remote sites for training purposes cost prohibitive. These hardware platforms include respective costly software systems, for example, UNIX or AIX, SunOS, HP-UX, NT etc., which add further cost and sophistication mitigating against shipping and configuring the central resources at a remote site for training. These systems may each have, additionally, a wide variety of other software applications which are to be accessed remotely.

The central site also contains specialized equipment 16 and/or software, for which training is required, which in this illustrative embodiment is a Symmetrix® Integrated Cache Disk Array from EMC Corporation Hopkinton, Mass. Such specialized equipment is accessible via, and requires in operation, one or more of the stationary facilities 12, 14. Thus, the central site comprises a first network comprising a plurality of commonly commercially-used mainframes or systems configured to access sophisticated and costly storage equipment and related software. Clearly, shipping the various mainframe computers and the Symmetrix storage system to a remote site for training would be complicated and expensive.

As illustrated in FIG. 1, the host processor computer(s) and Symmetrix storage system are configured in the network to allow interconnectivity of the central site's computational resources. These resources must be routed and switched. As will be appreciated by those skilled in the art, in a computer network a router is a piece of hardware with software that determines the next point on the network to which a given piece of information is sent toward its final destination. The router is generally connected between networks and decides how to send data bundles, or "packets," based on the current states of the networks it serves. A router at the server side of a network is called a "gateway". The present invention has the central site configured as the server side and a corresponding router 20 as a gateway. As will be discussed further hereinbelow, in the illustrative embodiment of the invention the classroom resources are configured as networked clients.

The present invention utilizes a hardware solution for routing, in the form of router 20, on the server side. Technology has dramatically improved router reliability and flexibility in recent years, and routers contain their own software for governing operations. Generally, a router's software maintains information regarding the available data routes, their conditions, distance and cost algorithms to determine the best route for a given data packet. In the present invention, the router is relied upon to distribute the computational power of the central site resources to the remote classroom.

The router 20 advantageously provides both routing and bridging for a wide variety of protocols and network media between the central facilities resources and the remote site. The router comprises network interfaces resident on port adapters, that provide a connection between the router's Peripheral Component Interconnect (PCI) busses and external networks, and advantageously support any combination of interfaces, such as Ethernet, Fast Ethernet, Token Ring, FDDI, ATM, serial, ISDN, and HSSI.

The router 20 in this illustrative embodiment also accommodates online insertion and removal (OIR) of port adapters and service adapters, allowing updates without taking the network off-line for added flexibility. The selected router is based on an architecture of field replaceable units (FRUs), and includes flash memory (PCMCIA) ports or other means for rapid updating of software. A representative router 20 for the central facility is the Model 7200 Series available from Cisco® Systems.

The present invention relies on a packet-switched architecture, as opposed to a circuit switching model. Circuit switching provides a specific path that is used exclusively by two or more nodes. The path is dedicated and continuously connected during its use. By contrast, packet-switching, such as used on the internet, allows all network users to share the same paths at the same time. The actual route traveled by a data packet varies according to traffic and availability of a path. When a transmission is initiated, a piece of data is split into packets, and each packet is addressed and disseminated. As the data packets travel, they are frequently passed along different paths to the final destination where the data is reassembled.

To enable a switched architecture, a standalone switch 22 is connected between the router 20 and the central site's various computational resources. The switch replaces shared hubs, such as 10 BaseT hubs. The standalone switch 22 can be connected, in addition to the central site router, to other routers and any other users connected to the central facility, such as onsite classrooms, internet gateways, WinFrame® servers, etc. The instant invention utilizes a switched architecture for faster and more efficient data traffic, as opposed to a ring or bus architecture, in which all network locations inspect each message and act only on those addressed to that destination.

The switch 22 selects a path for sending a unit of data to or from each of the central site's resources to its next destination. In general, a switch is contrasted to the router in that the router requires knowledge about the network and how to determine the route, whereas the switch merely allocates available bandwidth to the required traffic. In modem networks, switches are found at the backbone and gateway levels, where one network connects with another and at the subnetwork level where data is being forwarded close to its destination or origin.

The standalone switch selected in the illustrative embodiment optimizes the balance between flexibility and network latency. The switch is capable of delivering up to 320 Mbps forwarding bandwidth and 450,000 pps aggregate packet forwarding rate. It is flexibly configurable between cut-through and store-and-forward switching. A representative standalone switch 22 for the central facility is the Catalyst 1900 Series available from Cisco® Systems.

The illustrative embodiment of the present invention relies on client/server architecture using specific software for accessing the three different types of host processors: Mainframe, Unix and NT. A centrally located server is used which communicates with the remote clients and runs individual sessions for each client when the clients are accessing the UNIX based host processor(s). This server 15 (FIG. 1) can be an NT-based platform running application server operations software, e.g. WinFrame® software by Citrix Systems.

Figure 2:
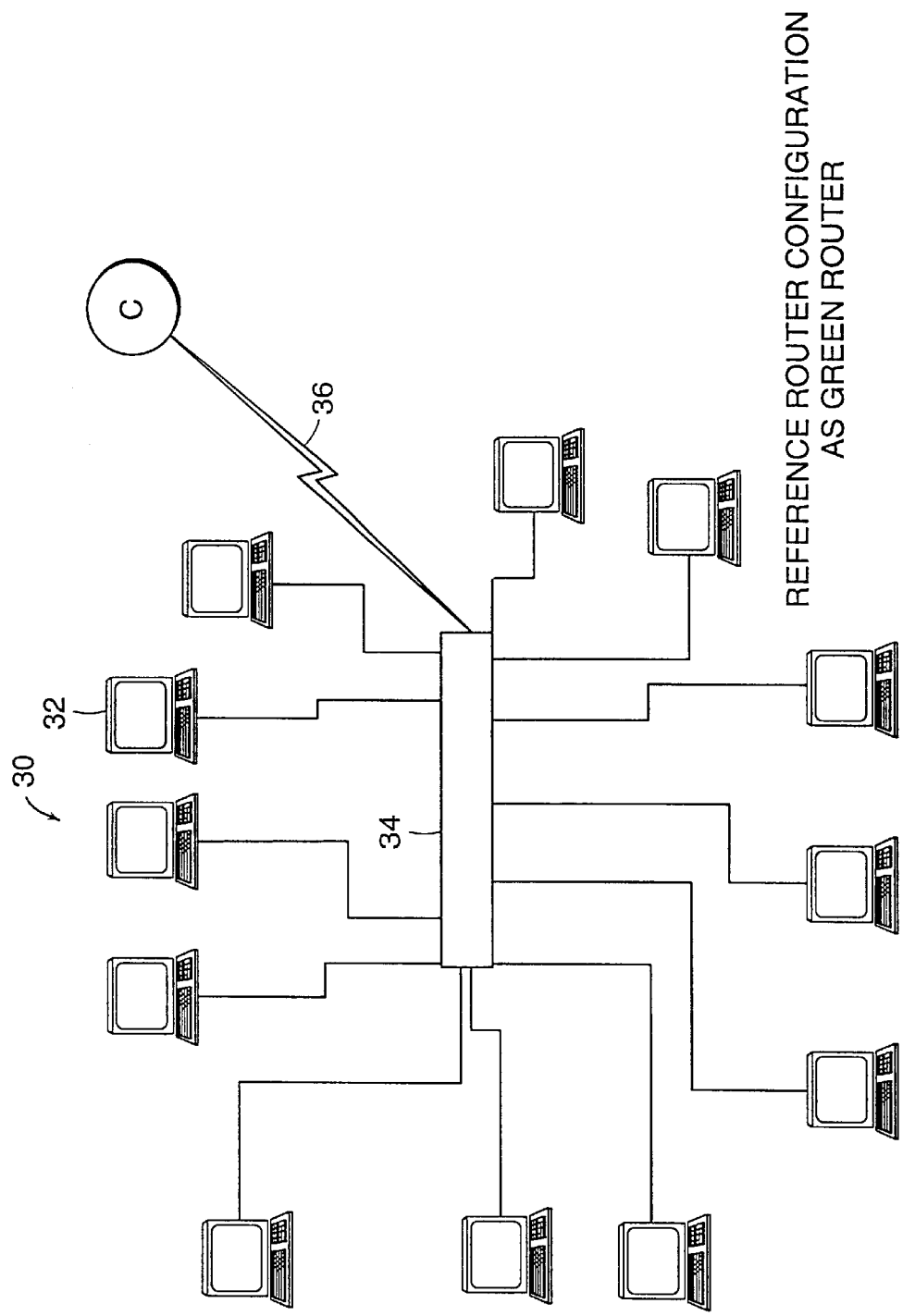
FIG. 2 is a block diagram of hardware required at a remote site for training using the distance learning configuration of FIG. 1.

A remote site 30, referring to FIGS. 1 and 2, is the client side of the client/server implementation according to the invention. The remote site 30 is configured to provide each classroom participant with his or her own computer 32 for real-time online training in the environment of the central site's resources. According to the illustrative embodiment, PC laptops running Windows® 95 were selected for portability, availability, supportability and familiarity to most computer users. These laptops are configured to serve as emulation terminals using X-Windows compatible clients, when communicating with UNIX and NT based host processors, and as 3270 emulation terminals when communicating with MVS based Mainframe host processors.

Exceed® is a widely used emulation software allowing cross-platform, hardware-independent window-based network interface, allowing PCs to access many different computing platforms. Exceed, available from Hummingbird Communications, is advantageously available for virtually any workstation, mainframe or high-end microcomputer.

The Exceed software is itself based on a server/client architecture, and facilitates the client/server implementation according to the invention. In emulation the central site facilities, i.e. the server, controls the display directly, and is responsible for all input/output via the keyboard, mouse or display on the laptop. The clients communicate with the server causing the server to open one or more remote sessions to handle input and output for that client.

Various connection mechanisms will now be described which allow the laptops on the remote network to flexibly and selectively connect to the central site.

For laptops 32 at a remote site to access the centrally located mainframe 12, the computer user starts a client session of Exceed which is used in the 3270 terminal emulation mode, by selecting an appropriate icon. This session request is sent through the remote router 34, through the ISDN line 36 to the centrally located router 10 and therethrough to the centrally located switch to the mainframe 12, where it effects a login.

For laptops 32 at a remote site to access the centrally located NT server(s) 14, the computer user starts a client session of a program Carbon Copy® available from Compaq Computer Corp., which is used for terminal emulation. This session request is sent through the remote router 34, through the ISDN line 36 to the centrally located router 10 and therethrough to the centrally located switch to the NT server 14 requested, where it effects a login.

For laptops 32 at a remote site to access the centrally located UNIX server(s) 14, the computer user starts a client session of Winframe, which is used as the client/server software. This session request is sent through the remote router 34, through the ISDN line 36 to the centrally located router 10 and therethrough to the centrally located switch to the WinFrame server 15. At the centrally located WinFrame server, the client software logs into an account. The account information is maintained on each of the laptops at the remote site. Once the remote site client logs on to the centrally located WinFrame server, an Exceed session is started. The Exceed session will examine each of the connections on the standalone switch 22 and present to the remote site session a list of available UNIX servers 14. One of the UNIX servers 14 is then selected and the remote session can then log in.

For UNIX based host processors, the laptops 32 at the remote facility 30, i.e. the clients, do not access the host processors directly. Rather, they communicate with the WinFrame server, which handles all input and output. In contrast to classical monolithic mainframne-terminal based computing, the WinFrame server running Exceed does the real computing and display work. The clients communicate with the WinFrame server, causing the WinFrame server to open one or more sessions to handle input and output from that client.

This software/hardware architecture advantageously allows the remote clients, i.e. lap tops 32 run by trainees, to run on the much more powerful central site machines 12, 14 using their high-resolution displays in real-time. Further, a number of remote site clients may all send input and output to the same or different central site facilities or servers. In the illustrative embodiment, for example, it is possible for different classroom participants to access different resources at the central site, for example a Hewlett-Packard K460 or a Sun Ultra 2 Model 2200, each of which are connected to the Symmetrix® data storage system 16. In this way flexible training can be delivered.

The personal computers 32 used at the remote site are connected to a remote site hub router 34 designed for the appropriately sized access environment. As discussed generally above, the router 34 is responsible for managing the traffic, in this case the emulation traffic generated by the remote site computers. In the illustrative embodiment, the system relies on ISDN connectivity between the remote 30 and central site 10, thus the hub router in the illustrative embodiment contains an ISDN Basic Rate Interface (BRI) and terminal adapter, and includes scaleability through the inclusion of repeater connectivity and additional synchronous interfaces for added remote connectivity. A representative hub router 34 for the remote facility 30 is the Model 2516 available from Cisco ® Systems.

The setup of the remote site is handled easily by an education specialist. A minimal amount of hardware needs to be handled. The laptops 32 are each connected to the hub router 34 using appropriate cables, for example standard Ethernet cables. The hub router 34 is next connected to a remote ISDN circuit 36 using a standard NT-1 network terminator. The network terminator provides the interface between the ISDN circuit 36 and the hub router 34. A representative NT-1 terminator is available from Pacific Electronics Technology Co., Ltd.

After the connections are made, connectivity tests between the remote PCs 32 and the hub router 34, between the hub router 34 and each of the central site router 20 and resources 22, 12, 14 can commence.

The invention accommodates multiple remote sessions 30 accessing the central facility at the same time. These discrete remote sessions can be run at the same time, and at the same time that local training is being provided at the central facility using the same central site equipment.

In addition to PCs 32, a typical remote multimedia presentation apparatus, such as an LCD screen projector or the like can also be implemented for displaying educational programming to the class at the remote facility.

While the illustrative embodiment herein is described as using particular models of routers, switches, PCs and communications interconnections, it should be appreciated that alternative models having substantially similar capabilities could be configured in an implementation according to the invention Similarly, although an Amdahl mainframe, or UNIX-based or NT-based servers are described in the illustrative embodiment herein as representative host processors, it will be appreciated that more host processors can be implemented at the central facility, such as IBM mainframe host processors or the like.

While an Integrated Cache Disk Array is described in the illustrative embodiment as being connected to the host processors for effecting training in the real-time environment of these costly, sophisticated apparatus, it will be appreciated that other equipment could be located at the central site and inter-networked with the host processor(s).

Although the invention has been shown and described with respect to exemplary embodiments thereof, various other changes, additions and omissions in the form and detail thereof may be made therein without departing from the spirit and scope of the invention.

What is claimed is:

1. A method for effecting a distance learning configuration, comprising the steps of:
    configuring a training apparatus in a central network, the central network including at least one host processor;
    providing at least one training computer configured in a remote network;
    establishing a communication channel between the central network and the remote network;
    providing a connection mechanism selectively linking the central network to the remote network over the communication channel, the connection mechanism establishing a selected one of the at least one training computers as a client in communication with a selected one of the at least one host processors networked with the training apparatus, wherein a user of the training computer can utilize the training apparatus in conjunction with a selected one of the at least one host processor in a real-time operating environment.

2. The method of claim 1, wherein the at least one host processor comprises a mainframe computer, and the connection mechanism comprises a 3270 terminal emulator client software operative on the selected one training computer.

3. The method of claim 1, wherein the at least one host processor is an NT-based server, and the connection mechanism comprises Windows-based terminal emulator client software on the selected one training computer.

4. The method of claim 1, wherein the at least one host processor is a UNIX-based server, and the connection mechanism comprises:
    Windows-based terminal emulator client software on the selected training computer,
    a central server configured for application server operations networked with said central network.

5. The method of claim 1, wherein the at least one host processor comprises at least one of a mainframe computer, an NT-based server and a UNIX-based server, and wherein the connection mechanism comprises at least one of a 3270 terminal emulator client operative on at least one of the at least one training computers, a Windows-based terminal emulator client on at least one of the at least one training computers, and a Windows-based terminal emulator client on at least one of the at least one training computers together with a central server configured for application server operations networked with said central network.

6. The method of any one of claims 1–5, wherein the remote network comprises a remote router directing data to a next network point toward the final destination.

7. The method of any one of claims 1–5, wherein the central network comprises a gateway router directing data to a next network point toward the final destination.

8. The method of any one of claims 1–5, wherein the central network comprises a standalone switch.

9. The method of any one of claims 1–5, wherein the communication channel comprises an ISDN line.

10. The method of any one of claims 1–5, wherein the training apparatus comprises an integrated cache disk array.

11. A method of configuring a distance learning implementation, comprising the steps of:
    configuring a training apparatus within a central network, the central network having at least one host processor;
    configuring at least one training computer within a remote network;
    providing a communication channel between the central network and the remote network;
    selectively linking the central network to the remote network over the communication channel and establishing a selected one of the at least one training computers as a client in communication with a selected one of the at least one host processors networked with the training apparatus
    utilizing the training apparatus in conjunction with a selected one of the at least one host processor in a real-time operating environment.

12. A method for training users on a centrally located resource from a remote site, the centrally located training resource networked to a central network having at least one host processor, and the central network being connected via a communication channel to the remote site, comprising the steps of:
    connecting at least one training computer to a remote router;
    connecting the router to the communication channel;
    completing a real-time connection to the centrally located training resource from the at least one training computer;
    instructing a user of the at least one training computer on the operation of the centrally located training resource.

* * * * *